(12) United States Patent
Vanzante

(10) Patent No.: US 9,176,886 B2
(45) Date of Patent: Nov. 3, 2015

(54) METHOD AND SYSTEM FOR FILLING CACHE MEMORY FOR CACHE MEMORY INITIALIZATION

(75) Inventor: Craig A. Vanzante, Roseville, CA (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 1850 days.

(21) Appl. No.: 11/590,208

(22) Filed: Oct. 30, 2006

(65) Prior Publication Data
US 2008/0104322 A1     May 1, 2008

(51) Int. Cl.
*G06F 12/00*     (2006.01)
*G06F 12/08*     (2006.01)

(52) U.S. Cl.
CPC ........ *G06F 12/0891* (2013.01); *G06F 12/0802* (2013.01)

(58) Field of Classification Search
USPC ................... 711/118, 128, E12.017, E12.022
See application file for complete search history.

(56) References Cited

U.S. PATENT DOCUMENTS

| | | | | |
|---|---|---|---|---|
| 5,752,262 A * | 5/1998 | Cassetti et al. | ................ | 711/135 |
| 6,591,393 B1 * | 7/2003 | Walker et al. | ......... | 711/E12.043 |
| 6,668,307 B1 * | 12/2003 | Damron | .......... | 711/137 |
| 2003/0221067 A1 * | 11/2003 | Jacobs | .......... | 711/118 |
| 2004/0205299 A1 * | 10/2004 | Bearden | ....................... | 711/137 |
| 2005/0268038 A1 * | 12/2005 | Yasue | .......................... | 711/118 |

OTHER PUBLICATIONS

"The American Heritage College Dictionary 4th Edition," Houghton Mifflin, pp. 1459.*

* cited by examiner

*Primary Examiner* — Michael Krofcheck
(74) *Attorney, Agent, or Firm* — Wagner, Murabito & Hao

(57) ABSTRACT

Embodiments of the present invention relate to the filling of cache memory for cache memory initialization. In one embodiment, cache architecture dependent data is loaded into cacheable memory. The flow of initialization execution is transferred to the cache architecture dependent data in response to a trigger that indicates that an initialization of cache memory has been initiated. Each line contained in cache memory is filled using the cache architecture dependent data. The flow of initialization execution is returned back to the place in the initialization process from which it was transferred when the filling of cache memory is completed.

37 Claims, 14 Drawing Sheets

|  | Set 0 | Set 1 | Set 2 | Set 3 |
|---|---|---|---|---|
| Cycle 1 | Pattern Set 0 | Pattern Set 1 | Pattern Set 2 | Pattern Set 3 |
| Cycle 2 | Pattern Set 3 | Pattern Set 0 | Pattern Set 1 | Pattern Set 2 |
| Cycle 3 | Pattern Set 2 | Pattern Set 3 | Pattern Set 0 | Pattern Set 1 |
| Cycle 4 | Pattern Set 1 | Pattern Set 2 | Pattern Set 3 | Pattern Set 0 |

Shift Replacement Pattern Order Once With Each Cycle →

```
            ldr     r3,bdata            ; do this in what becomes data area
            ldr     r1,=0x3800
            ldr     r2,return2r0        ; load instruction to load pc from r0
            str     r2,[r3, r1]         ; store this as the last instruction
            ldr     r2,b32bytes         ; load instruction to branch up 32 bytes
branches:
            subs    r1,r1,#0x20         ; working down from the top ...
            str     r2,[r3,r1]          ; load every 32bytes with a branch to the next 32
            bne     branches            ; only need 4 - 2Kb regions, but fill it
                                        ; all since it is easier ldr     r2,b2kbytes         ; load instr to branch to start of next 2Kb
            add     r1,r3,#0x800
            str     r2,[r1]             ; store branch at start of 2nd 2Kb region
            add     r1,r1,#0x1000
            str     r2,[r1]             ; store branch at start of 4th 2Kb region
            add     r1,r1,#0x1000
            str     r2,[r1]             ; store branch at start of 6th 2Kb region ldr     r1,=0x7f8           ; load value to add to PC for 2Kb branch
            ldr     r0,icidone          ; load location to branch back to into r0
            mov     pc,r3               ; jump out to the branches!

icacheinitdone:
            ldr     r0,=ARM_ICBASE
            ldr     r1,=0x4
            str     r1,[r0,#0x4]        ; clear any icp error we have created
            ;; parity protected icache after this!

b32bytes:
            add     pc,pc,#0x18         ; branch to 32bytes later
b2kbytes:
            add     pc,pc,r1            ;branch to 2kbytes later
return2r0:
            mov     pc,r0
icidone     DCD icacheinitdone
```

Figure 2E

METHOD AND SYSTEM FOR FILLING CACHE MEMORY FOR CACHE MEMORY INITIALIZATION

BACKGROUND ART

Random-access memory (RAM) is a data storage mechanism that allows stored data to be accessed at random instead of in sequence. RAM is conventionally employed to hold operating systems, application programs and data that are in current use by a computer system. This allocation of data storage responsibility allows such information to be speedily accessed by a computer system processor. This is because RAM is much faster to read from and write to than many other types of storage mechanisms.

Cache memory is random access memory (RAM) that a computer microprocessor can access even more quickly than regular RAM. Cache memory is used to temporarily store information. As the microprocessor processes data, it looks first to cache memory and if the data that is desired is found (such as from a previous reading of data), the more time-consuming reading of data from slower memory is avoided.

Cache memory is described in levels of closeness and accessibility to the microprocessor. An L1 cache is on the same chip as the microprocessor. L2 cache is usually a separate static RAM. The main RAM is usually a DRAM chip.

In many cases, especially after a system powerup, cache memory can be filled with random unknown data that can make reliable error checking very difficult. This is because the information that is to be checked for errors can contain the aforementioned random unknown data rendering reliable comparisons practically impossible.

Various techniques are currently employed as a means of ensuring the integrity of the data that is contained in RAM. In one conventional approach, data integrity checking (like parity checking) is used as a means of detecting errors particularly to combat problems such as soft errors (e.g., bit flips). Using this approach the data integrity bits are initialized when the RAM is written to.

However, in the case of cache memory, which is actually not directly written to by the computer processor, the loading of lines into cache memory must take place via an indirect mechanism. Some cache memories offer mechanisms that facilitate the forcible loading of lines into memory by the processor. However, these mechanisms are often cumbersome and complex.

Moreover, some cache architectures allow the user to "lock" known information into cache memory addresses. However, this approach involves a special mode of operation that requires special machine instructions and often involves complicated or cumbersome placement of known data in memory. It can also involve multiple iterations before data is finally locked into every line of cache memory. Alternatively, some cache memory designs employ the use of special hardware logic whose function is to initialize the cache to the proper state. However, this special hardware logic can be of such limited use that its cost/benefit ratio can be prohibitive.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2D illustrates the data replacement schedule followed to fill the entire cache according to one embodiment of the present invention.

FIG. 2E shows an example of an algorithm for filling cache memory according to one embodiment of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

For purposes of the present application the term replacement cycle is intended to refer to a portion of data replacement activity in a round robin replacement scheme where a data replacement pass (according to a predetermined schedule of data replacement) through each of the sets of a cache memory occurs once.

Figure 1A:
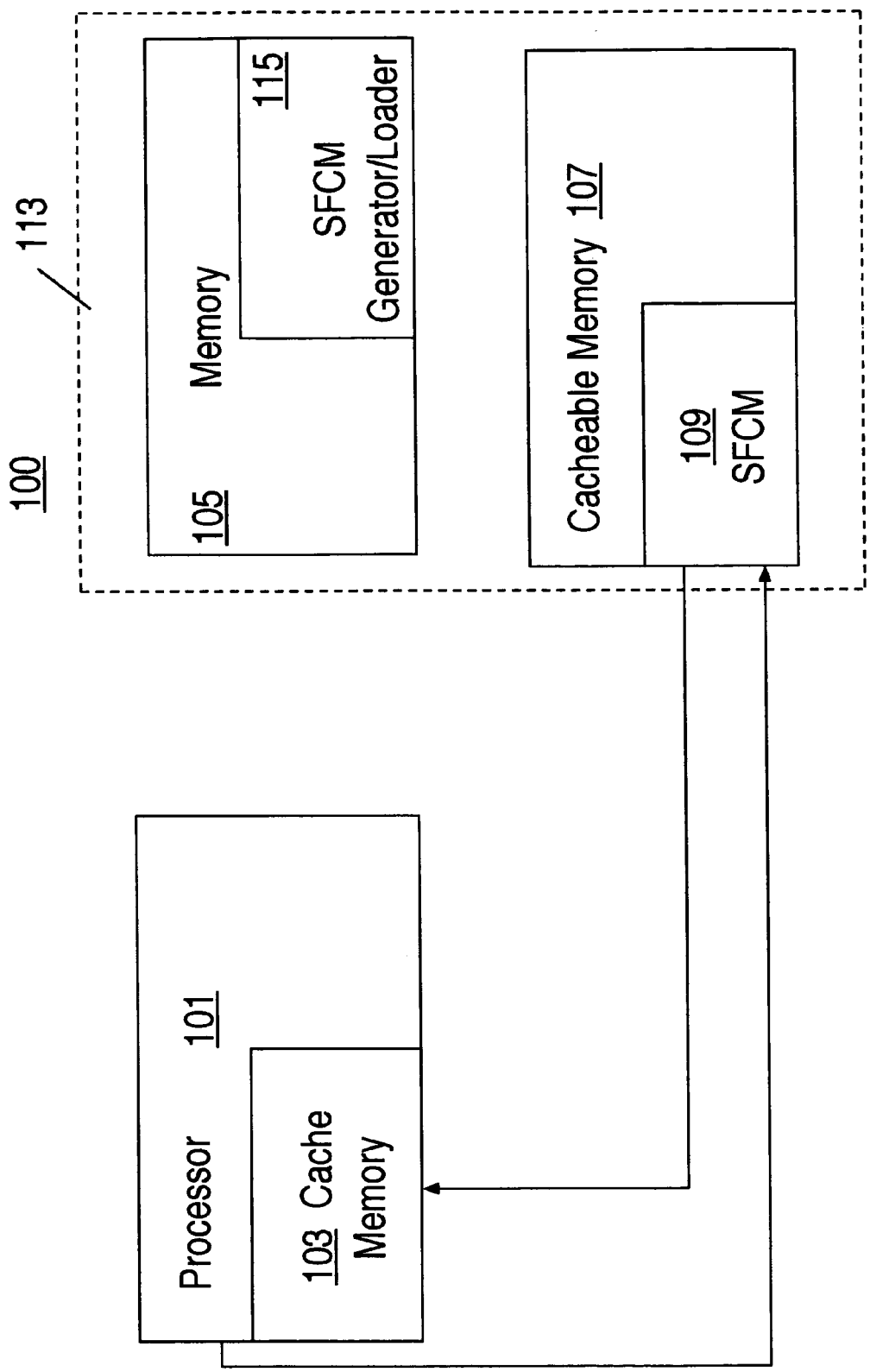
FIG. 1A shows components of a computer system that includes a processor with cache storage that has an associated system for filling cache memory according to one embodiment of the present invention.

Computer System Including System for Filling Cache Memory for Cache Memory Initialization According to Embodiments of the Present Invention FIG. 1A shows components of a computer system 100 that includes a processor with cache storage that has an associated system for filling cache memory (SFCM) according to one embodiment of the present invention. The system for filling cache memory assures the filling of cache memory with known instructions or data upon the initiation of a cache initialization process so that reliable error checking can be performed. FIG. 1A shows processor 101, cache memory 103, computer storage units 113 (that include memory 105 and cacheable memory 107), SFCM 109, and SFCM generator/loader 115. Cache memory 103, memory 105 and cacheable memory 107 are examples of computer useable media having computer useable code embodied therein for causing a computer to perform operations.

Referring to FIG. 1A, processor 101 responds to and processes basic instructions that drive computer system 100. In the FIG. 1A embodiment, basic instructions can include instructions that are a part of SFCM generator/loader 115 and cache architecture dependent data that constitutes SFCM 109.

In one embodiment, the cache architecture dependent data, that constitutes SCFM 109 includes instructions that are devised to when executed operate in concert with the replacement algorithm of the cache, to effect the filling of each line of cache storage 103 with instructions or data as is described herein in detail with reference to FIGS. 2A-2F. Important factors used to devise the instructions can include but are not limited to knowledge of the cache type, knowledge of the data replacement schedule, and knowledge of the areas of the cache that can be left unfilled given the data replacement schedule of a particular data replacement algorithm.

In one embodiment, the instructions can be devised to cause the data replacement operations of the data replacement algorithm to be shifted at specified points during data replacement to allow the data replacement action of the replacement algorithm to fill the entire cache including portions of the cache that may not otherwise be filled. In one embodiment, in this manner instructions can be devised to act cooperatively with any non-random data replacement algorithm to cause the complete filling of a cache.

In one embodiment, the cache architecture dependent data can be constituted by either: (1) instruction branch patterns that when executed are loaded into the cache, (2) a list of addresses with associated instructions that when executed causes the replacement algorithm associated with the cache to cause the filling of the cache with the data that is located at the addresses, or (3) instructions with embedded data that encompasses a list of addresses that when executed cause the filling of the cache with the data located at the addresses.

In one embodiment, cache architecture dependent data of type (1) can be used to cause the filling of a cache with instruction branch patterns. In another embodiment, cache architecture dependent data of types (2) and (3) can be used to cause the filling of the cache with data.

Figure 1B:
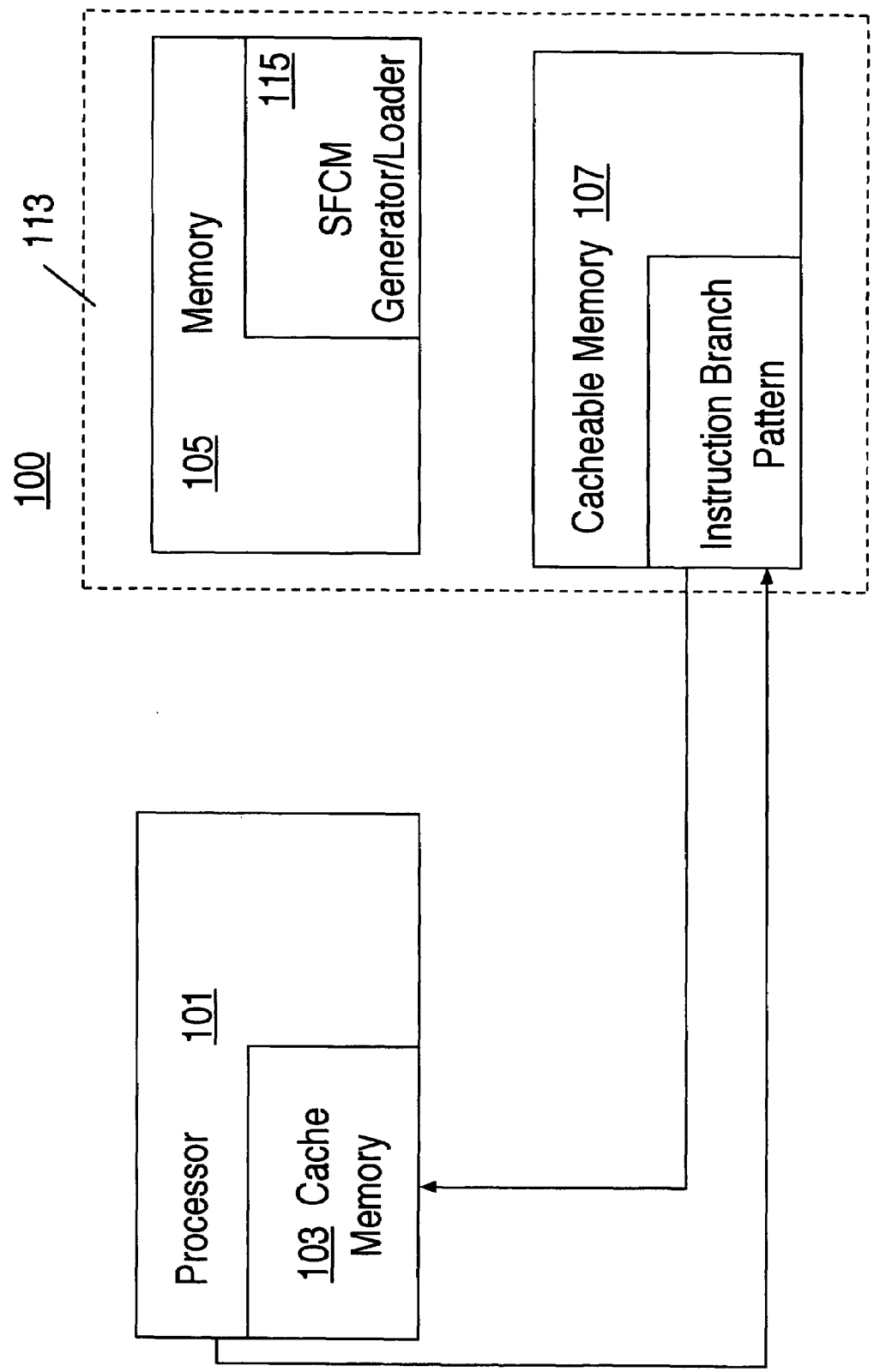
FIG. 1B shows an exemplary instruction branch pattern storage arrangement that can be used to facilitate the filling of cache memory with instruction branch patterns according to one embodiment of the present invention.

In one embodiment, where the filling of each line of cache memory 103 with instruction branch patterns is performed, instruction branch patterns can be loaded into and later retrieved from cacheable memory 107 of computer storage unit 113 (e.g., where the instruction branch patterns can be stored) as shown in FIG. 1B.

It should be appreciated that where the filling of each line of cache memory 103 with data is performed, additional factors may need to be considered. For example, the place in cache memory 103 where data is eventually directed to be loaded by the replacement algorithm is in part dependent on the address from which the data is retrieved. Accordingly, SFCM generator/loader 115 can determine, based on the data replacement schedule of the cache replacement algorithm involved, the addresses from which data should be retrieved in order to allow a complete filling of the cache. The addresses thus determined can be included in the list of addresses that SFCM generator/loader 115 generates as a part of the cache architecture dependent data.

Figure 1C:
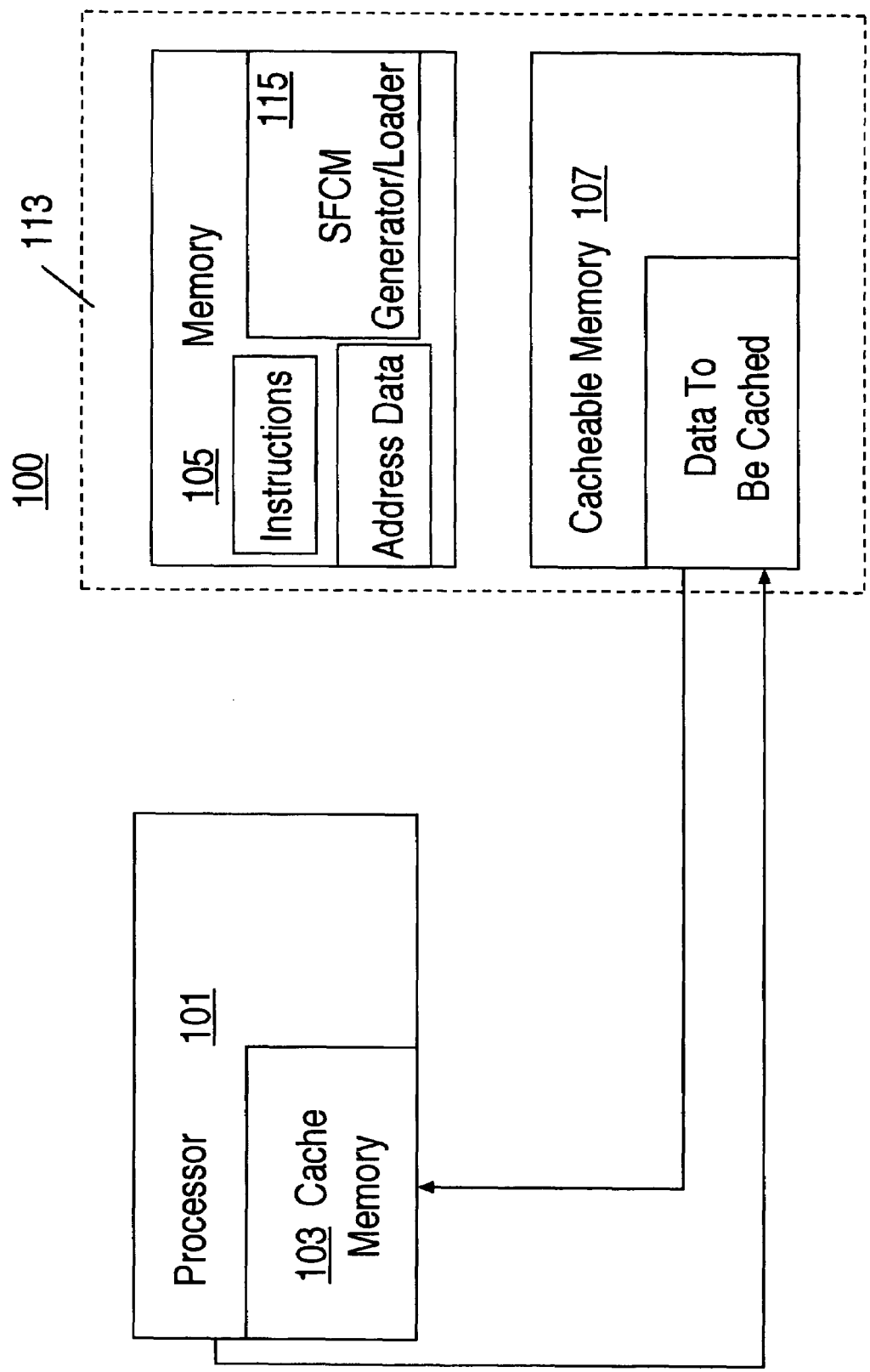
FIG. 1C shows an exemplary data/instruction storage arrangement that can be used to facilitate the filling of cache memory with data according to one embodiment of the present invention.
Figure 1D:
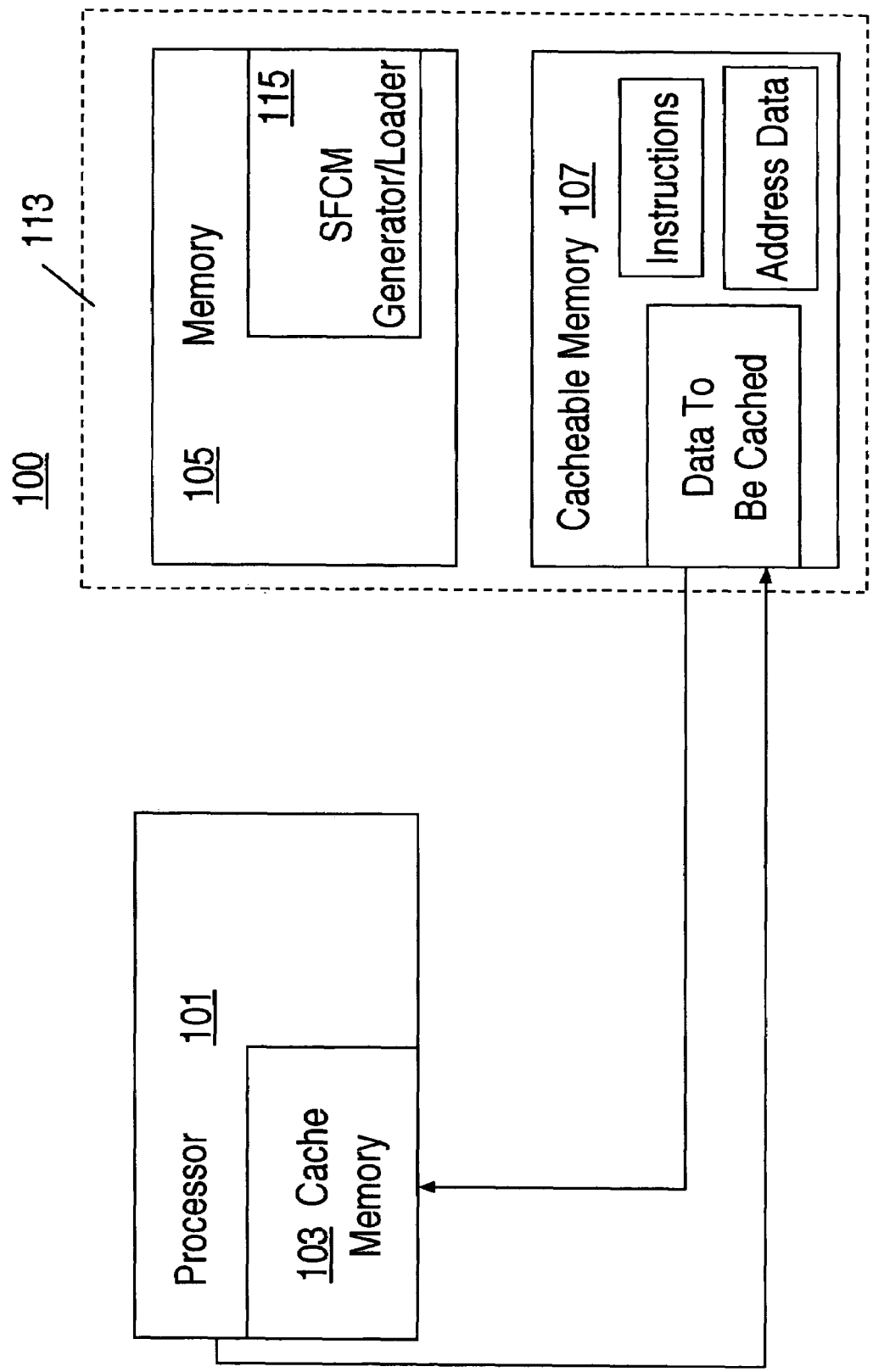
FIG. 1D shows an exemplary data/instruction storage arrangement that can be used to facilitate the filling of cache memory with data according to one embodiment of the present invention.
Figure 1E:
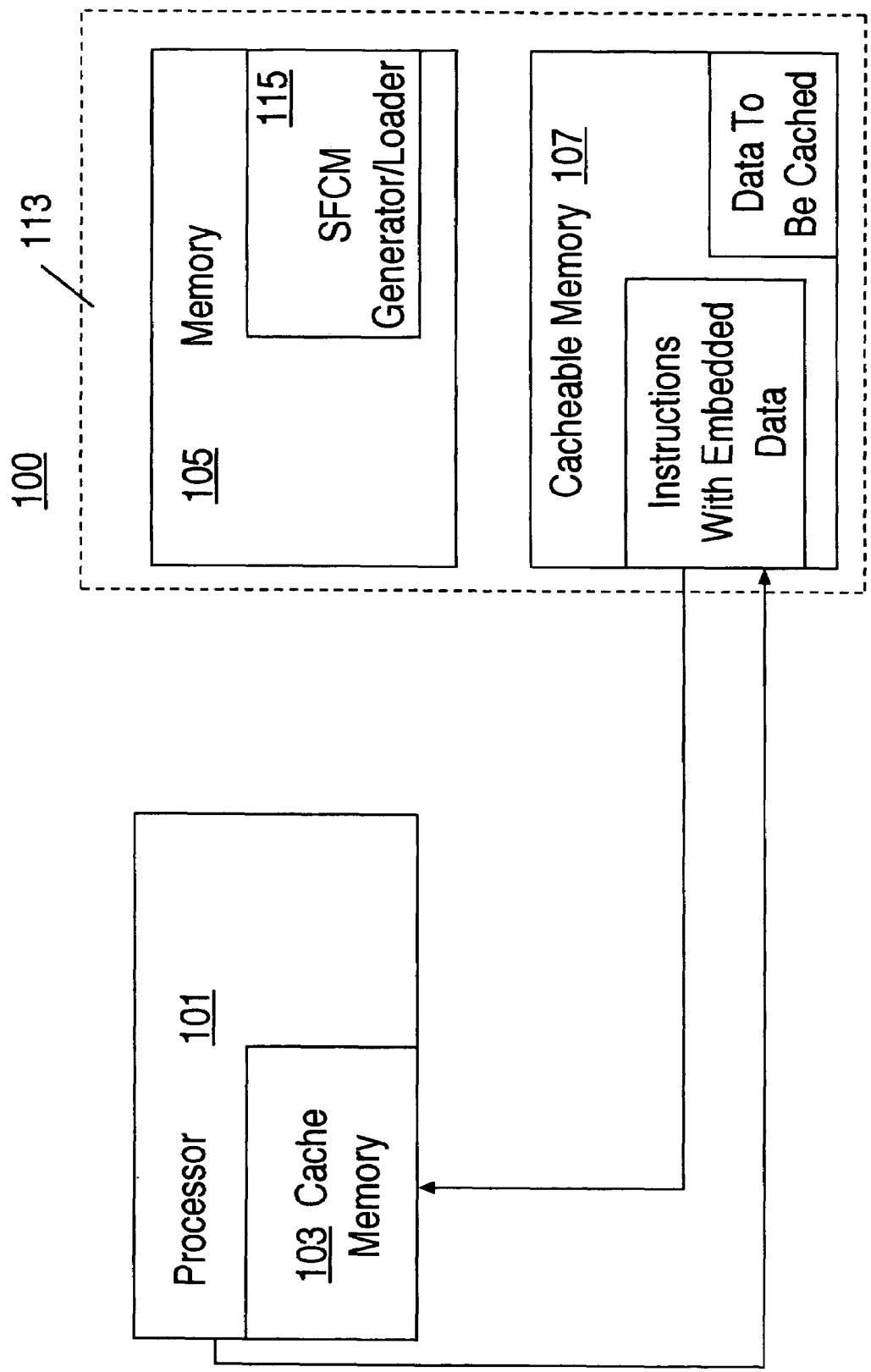
FIG. 1E shows an exemplary data/instruction storage arrangement that can be used to facilitate the filling of cache memory with data according to one embodiment of the present invention.
Figure 1F:
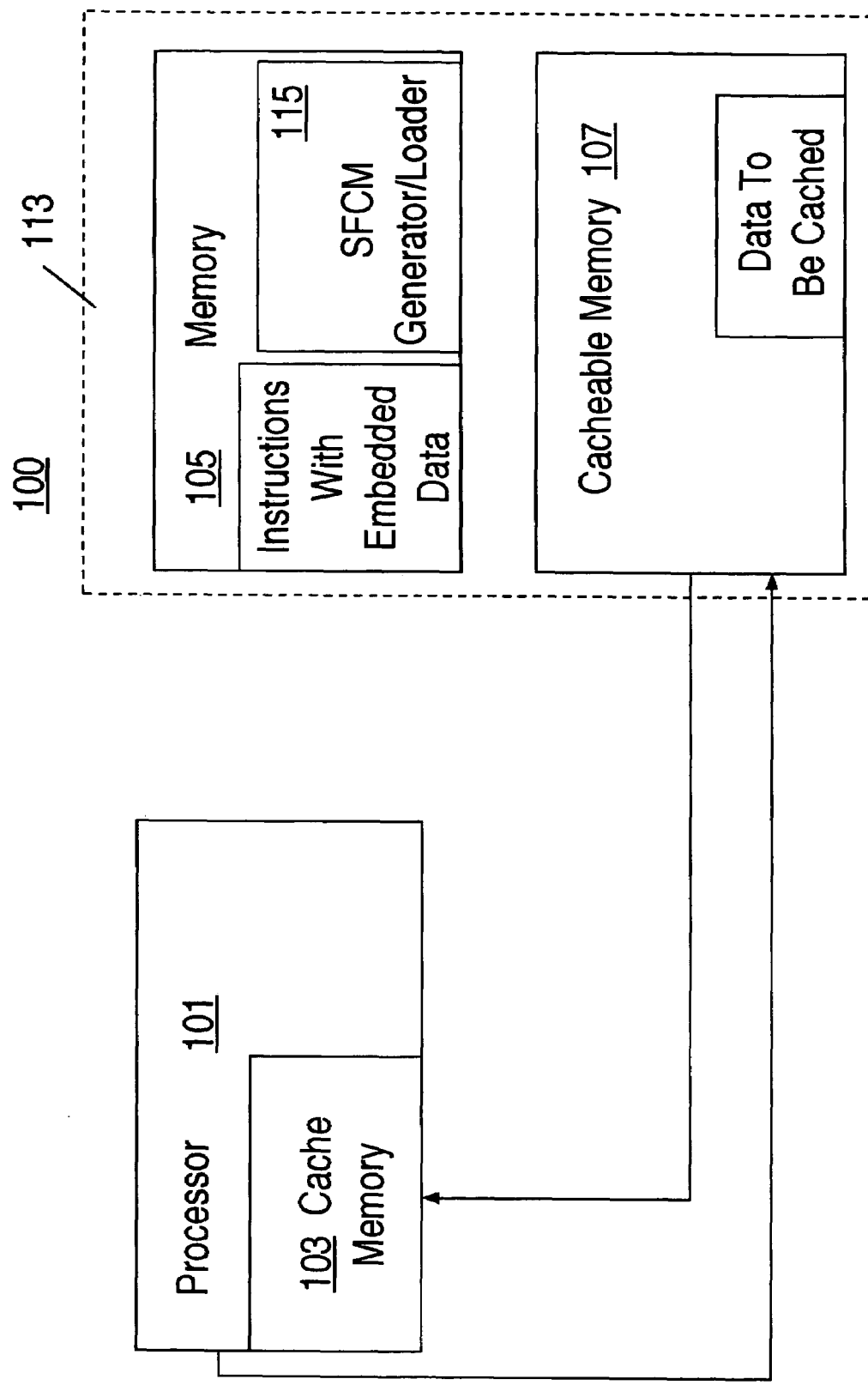
FIG. 1F shows an exemplary data/instruction storage arrangement that can be used to facilitate the filling of cache memory with data according to one embodiment of the present invention.

In embodiments that involve the filling of cache memory with data as opposed to instructions, a plurality of data/instruction storage arrangements can be employed. FIGS. 1C-1F show exemplary data/instruction storage arrangements that can be used to facilitate the filling of cache memory with data according to one embodiment of the present invention. In FIG. 1C, data to be loaded into cache memory is stored in cacheable memory while its associated instructions and address data are shown as stored in other memory. In FIG. 1D, data to be loaded into cache memory and its associated instructions and address data are shown as stored in cacheable memory. In FIG. 1E, instructions that include embedded data are shown as stored in cacheable memory. In FIG. 1F instructions with embedded data are shown as stored in other memory. In other embodiments, variations of the data/instruction storage arrangements shown in FIGS. 1C-1F can be used, for example, in FIGS. 1C and 1D the address data and instructions can be stored in different types of memory.

It should be appreciated that in the case where data to be loaded into cache memory and associated instructions are both stored in cacheable memory (FIGS. 1D and 1E), the addresses from which data is to be retrieved to facilitate the filling of cache memory can be different than when data to be loaded into cache memory is stored in cacheable memory and its associated instructions (and address data) are loaded into other memory. This can be because each access of cacheable memory either for instructions or for data affects the replacement algorithm. Consequently, in one embodiment, the affect on the replacement algorithm that results from the retrieval of instructions from cacheable memory may need to be taken into consideration in the determination of address locations from which data should be retrieved for loading into cache memory.

It should be appreciated that, the filling of cache storage 103 with instructions or data assures a reliable error checking process because the data that is being checked is known. Consequently, detected errors can be reliably identified as true errors.

Cache memory 103 is RAM memory that processor 101 can access more quickly than regular RAM. In one embodiment, through the processes discussed above, cache memory 103 is completely filled with instructions or data to assure a reliable error checking process. Because cache memory, e.g., 103 possesses basic parameters such as line size, cache size, number of sets, associativity, and replacement algorithm, the cache architecture dependent data is chosen based on these basic parameters in order to ensure the filling of every line in cache memory 103.

In one embodiment, as discussed above SFCM 109 encompasses the aforementioned cache architecture dependent data that is employed to efficiently fill every line in cache memory 103. SFCM 109 can be generated and loaded into memory via the SFCM generator/loader 115. In one embodiment, the cache architecture dependent data that constitutes the SFCM can be generated by SFCM generator/loader 115 based on the basic parameters of the particular cache architecture that is to be filled (e.g., cache size, number of sets, associativity, and replacement algorithm).

Referring again to FIG. 1A, memory unit 105 and cacheable memory unit 107 of computer storage memory unit 113 can be employed to store generator/loader 115, and SFCM 109 as is shown.

In operation, upon the detection of the initiation of a cache initialization process, cache architecture dependent data that constitutes SFCM 109 is loaded into cache memory. The cache architecture dependent data guides the replacement of data in a manner that completely fills cache memory as is described in detail with reference to FIGS. 2A-2F below.

Figure 2A:
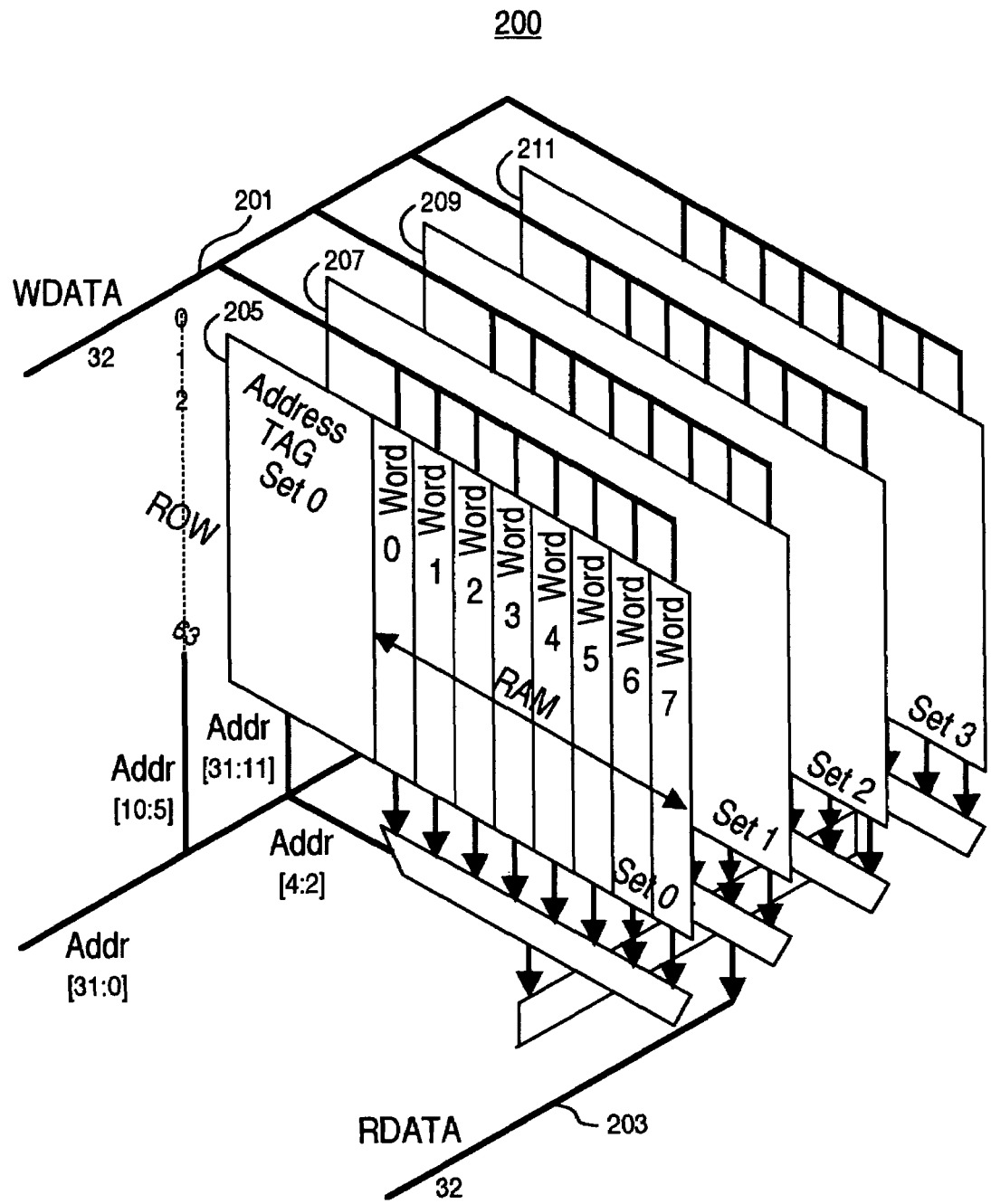
FIG. 2A illustrates the organization of a cache according to one embodiment of the present invention.

FIGS. 2A-2F illustrate the operation of SFCM 109 according to one embodiment of the present invention. FIG. 2A shows a four way set associative cache 200 with a row length of eight words 0-7 (32 bytes). In one embodiment, the four way set associative cache 200 supports single-cycle read accesses. In the FIG. 2A embodiment, four way set associative cache 200 includes write data line 201, read data line 203 and cache sets 0-3, 205-211.

Figure 2B:
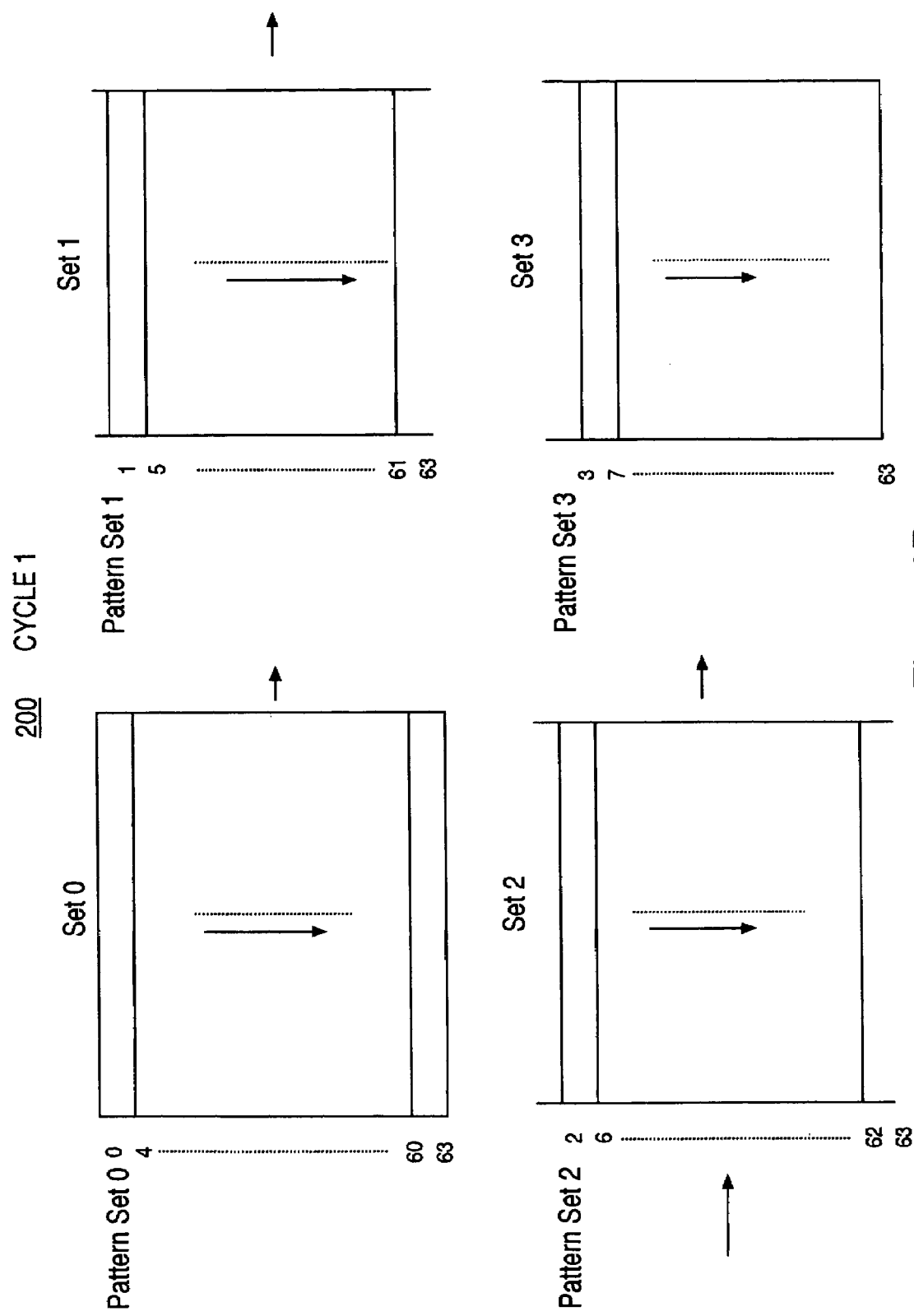
FIG. 2B illustrates the operation of SFCM according to one embodiment of the present invention.

Referring to FIG. 2A, the cache replacement policy (determined by the replacement algorithm associated with cache 200) determines how data contained in cache memory 200 (e.g., 103 in FIG. 1) is to be replaced. In one embodiment, a round robin replacement policy for a four way set associative cache 200 can result in the data replacement pattern that is shown in FIG. 2B. This is assuming a linear execution of addresses from low to high, starting at a set boundary (2 Kbyte aligned). As shown in FIG. 2B, in a first cycle of data replacement, every fourth row beginning with row 0, is filled with data resulting in the filling of rows 0, 4, 8, 12 . . . 60 in set 0 (pattern Set 0). In set 1 every fourth row beginning with row 1 is filled with data resulting in the filling of rows 1, 5, 9, 13 . . . 61 (pattern Set 1). In set 2 every fourth row beginning with row 2 is filled with data resulting in the filling of rows 2, 6, 10, 14 . . . 62 (pattern Set 2). In set 3 every fourth row beginning with row 3 is filled with data resulting in the filling of rows 3, 7, 11, 15 . . . 63 (pattern Set 3). As can be seen without a mechanism for adjusting the replacement pattern of the illustrated round robin replacement algorithm, the aforementioned pattern would be continuously repeated in each set, resulting in significant portions of the memory cache being left unfilled.

It is important to note that only a quarter of the rows in each set would be filled by a continuous retracing of the replacement pattern shown in FIG. 2B. Accordingly, in one embodiment of the present invention, after the illustrated first cycle of row fillings is completed (that leaves three quarters of the rows of cache memory 200 unfilled) three additional cycles that each fill an additional quarter of the rows in each set (that were initially left unfilled) are performed. In this manner the cache is fully filled with data in four data replacement cycles.

Figure 2C:
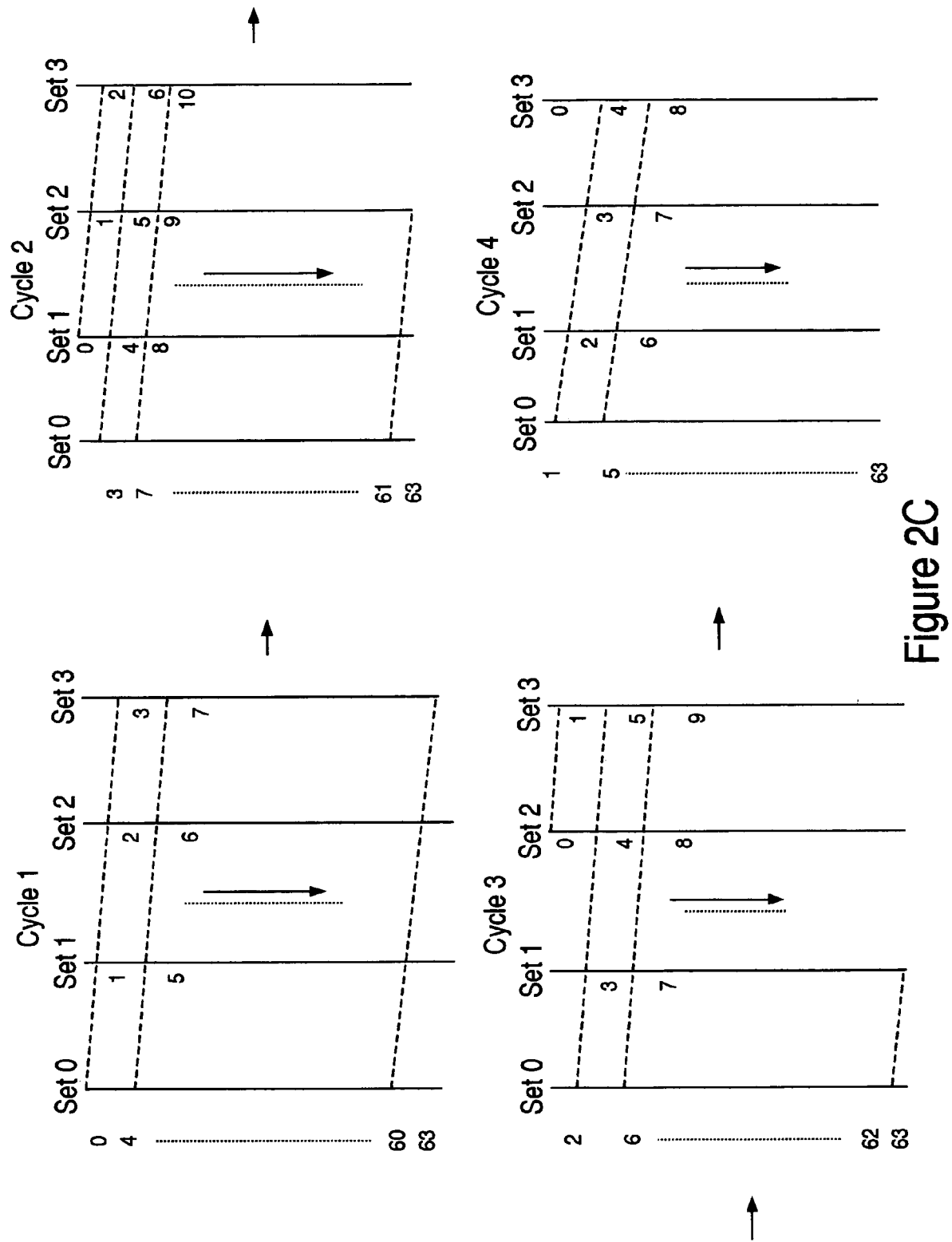
FIG. 2C illustrates the operation of SFCM according to one embodiment of the present invention.

FIG. 2C shows a perspective view of the sets 0-3 shown in FIG. 2A that is directed 90 degrees from a frontal view of the sets 0-3 shown in FIG. 2B. As shown in FIG. 2C, according to one embodiment, data is replaced in a manner that traces a series of diagonal stripes of data replacement across sets 0-3 in each of four cycles 1-4. As is shown, diagonal stripes of filled addresses are separated by four rows in each set. Each cycle fills addresses in the four sets that were unfilled in the previous cycle of fillings until a complete filling of the cache is effected as is shown.

FIG. 2D shows a chart of the replacement patterns that are used to fill specified rows of each set for each of four cycles as illustrated in FIG. 2C according to one embodiment of the present invention. Referring to FIGS. 2B-2D, in the first cycle the replacement patterns shown in FIG. 2B are used to fill rows of each set. In the second cycle, the replacement pattern that was used to fill specified rows of set 0 in the first cycle (pattern Set 0) is used to fill similar rows of set 1. Moreover, the replacement pattern that was used to fill specified rows of set 1 (pattern Set 1) in the first cycle is used to fill similar rows of set 2. In addition, the replacement pattern that was used to fill specified rows of set 2 in the first cycle (pattern Set 2) is used to fill similar rows of set 3, and the replacement pattern that was used to fill specified rows of set 3 in the first cycle (pattern Set 3) is used to fill specified rows of set 0.

In the third cycle, the replacement pattern that was used to fill specified rows of set 0 in the first cycle (pattern Set 0) is used to fill similar rows of set 2. Moreover, the replacement pattern that was used to fill specified rows of set 1 in the first cycle (pattern Set 1) is used to fill similar rows of set 3. In addition, the replacement pattern that was used to fill specified rows of set 2 in the first cycle (pattern Set 2) is used to fill similar rows of set 0, and the replacement pattern that was used to fill specified rows of set 3 in the first cycle (pattern Set 3) is used to fill similar rows of set 1.

Finally, in the fourth cycle, the replacement pattern that was used to fill specified rows of set 0 in the first cycle (pattern Set 0) is used to fill similar rows of set 3. Moreover, the replacement pattern that was used to fill specified rows of set 1 in the first cycle (pattern Set 1) is used to fill similar rows of set 0. In addition, the replacement pattern that was used to fill specified rows of set 2 in the first cycle (pattern Set 2) is used to fill similar rows of set 1 and the replacement pattern that was used to fill specified rows of set 3 in the first cycle (pattern Set 3) is used to fill similar rows of set 2. FIG. 2D illustrates the replacement schedule followed to fill the entire cache according to one embodiment of the present invention.

In one embodiment, by effecting the filling of the initially unfilled rows within each set with the rows filled initially in the other three sets a complete filling of each set can be effected (e.g., the filling of rows 0-63 in each set).

In one embodiment, because of the operation of the cache architecture dependent data contained in SFCM 109, instead of retracing the addresses previously replaced, the replacement algorithm directs the filling of addresses not previously filled to effect the complete filling of the memory cache as is shown in FIG. 2C.

FIG. 2E shows an exemplary algorithm 270 for filling cache memory according to one embodiment of the present invention. The algorithm of FIG. 2E is designed to guide the filling of the memory cache so that every entry in the memory cache is filled as is discussed above with reference to FIGS. 2A-2D. The algorithm is designed to fill an 8 Kb, 4 way cache that has 32 byte lines and has a round robin replacement policy.

It should be appreciated that the algorithm directs the placement of one instruction in each 32-byte row of each 2 Kb region as was discussed above. The replacement action stripes lines through all four sets of the cache as also was discussed above. In one embodiment, an instruction is placed in the last row of the last 2 Kb section to be filled in a cycle that instructs the filling of the first row that was filled in that cycle with a specific instruction. The instruction placed in the first row causes control to move to the first row of the next 2 Kb region. From this row an initiation of data replacement using the replacement patterns used to fill each 2 Kb region in the first cycle is begun.

In one embodiment, a counter can be used to trigger the movement of the starting place of data replacement from one set to the next in correspondence with transitions from one cycle to the next. In an alternate embodiment, some alternate means can be employed. It should be appreciated that, this action causes data replacement to be executed through the sets in a manner that makes a diagonal stripe of data replacements adjacent to and above the one made before as shown in FIG. 2C. This is done twice more whereupon control is branched back to the initialization process.

Figure 2F:
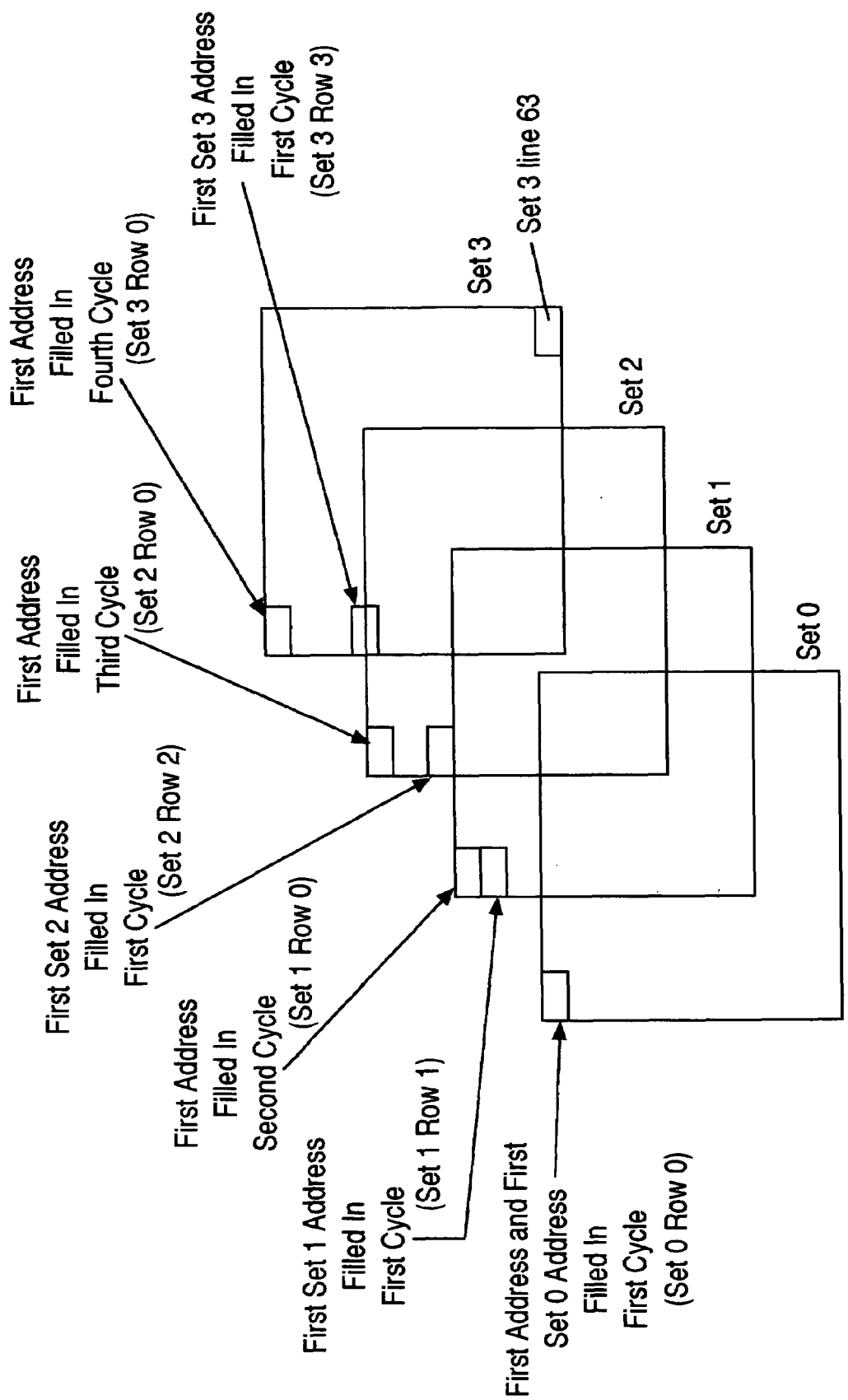
FIG. 2F illustrates the action of the algorithm of FIG. 2E in altering the pattern of data replacement made by the cache replacement algorithm causing data replacement that results in a completely filled cache.

FIG. 2F illustrates the action of the algorithm of FIG. 2E in altering the pattern of data replacement made by a round robin cache replacement algorithm that results in the complete filling of the cache. As shown in FIG. 2F an instruction loaded into row 63 of set 3 at the end of the first cycle causes an instruction to be loaded into row 0 of set 0 that in turn causes the second cycle of replacement to begin at row 0 of set 1 (an unfilled row above the row where replacement was performed in the first cycle of data replacement, see FIG. 2C). This is done through two more replacement cycles (at row 63 of set 0 causing a third cycle of replacement to begin at row 0 of set 2; and at row 63 of set 1 causing a fourth cycle of replacement to begin at row 0 of set 3) resulting in the complete filling of the memory cache with known data.

It should be appreciated that the algorithm of FIG. 2E is only exemplary and other algorithms that alter the data replacement result achievable by a cache replacement policy can be used. For example, in the FIG. 2E embodiment, an algorithm that causes the loading of an instruction at the end of the first cycle and each subsequent cycle of data replacement that results in the succeeding cycle of data replacement to each begin in an unfilled line of set 0. Moreover, algorithms designed to operate with other replacement schemes (e.g., least recently used, etc.) can be employed.

Figure 3:
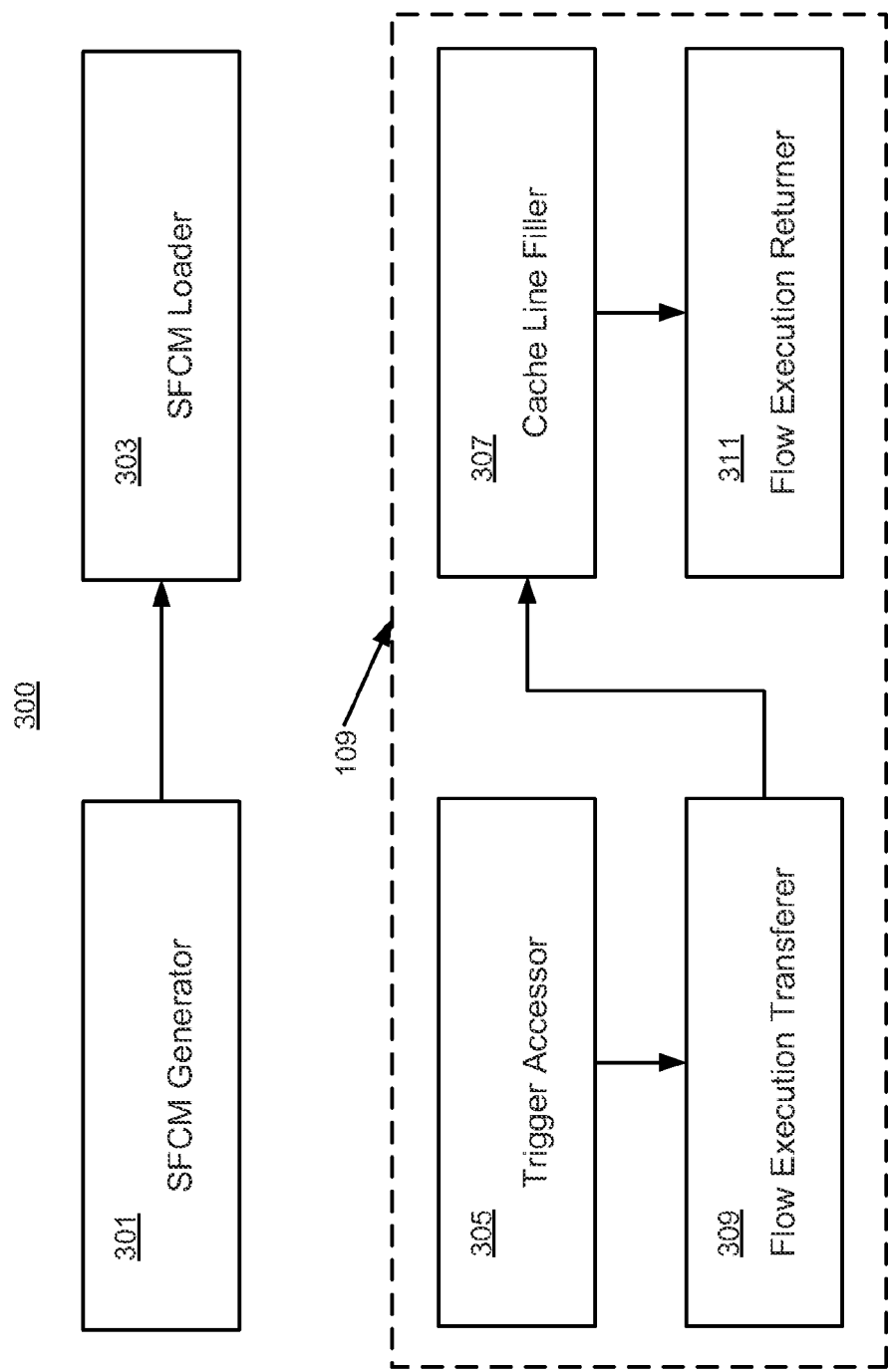
FIG. 3 shows a system and components thereof for filling cache memory according to one embodiment of the present invention.

System for Filling Cache Memory for Cache Memory Initialization According to one Embodiment of the Present Invention FIG. 3 shows a system 300 and components thereof for filling cache memory (SFCM) according to one embodiment of the present invention. As discussed above with reference to FIG. 2A, system for filling cache memory assures the filling of cache memory with known instructions or data upon the initiation of a cache initialization process so that reliable error checking can be performed. System 300 includes SFCM generator/loader layer 320 and line filler layer 350. As shown in FIG. 3, SFCM generator/loader layer 320 includes SFCM generator 301 and SFCM loader 303. In the FIG. 3 embodiment, line filler layer 350 includes SFCM 109 which is constituted by the previously discussed architecture dependent data that can include but is not limited to trigger accessor 305, flow execution transferer 309, cache line filler 307 and flow execution returner 311.

In one embodiment, SFCM 109, and components thereof, can be implemented in software or hardware or a combination of both. In one embodiment, the components of SFCM 109 can reside in a contiguous block of memory addresses. In another embodiment, the components of SFCM 109 can reside in non-contiguous blocks of memory or be spread across a wide range of memory. Moreover, components of line filler layer 350 of SFCM 109 can be encompassed by cache architecture dependent data that is generated and loaded by components of SFCM generator/loader layer 320.

Referring to FIG. 3, SFCM generator 301 generates SFCM 109 which directs the filling of cache memory (e.g., 103 in FIG. 1A). In one embodiment, SFCM 109 encompasses cache architecture dependent data that cause the filling of each of the lines in cache memory, to effect the complete filling of cache memory. In one embodiment, the generation of cache architecture dependent data is based upon identified parameters of said cache memory (e.g., 103 in FIG. 1A).

SFCM loader 303 loads the cache architecture dependent data that is generated by SFCM generator 301 into memory (e.g., 113 in FIG. 1A). The cache architecture dependent data is maintained in memory until retrieved by the processor for loading into designated cache memory locations. When prompted to do so, the processor retrieves the cache architecture dependent data to effect a transfer of execution to the cache architecture dependent data from the initialization algorithm.

Trigger accessor 305 accesses a trigger that indicates that an initialization of cache memory (e.g., 103 in FIG. 1A) is being initiated. The trigger prompts the processor to retrieve and load the cache architecture dependent data into cache memory as discussed above.

Flow execution transferer 309 transfers the flow of execution from the initialization algorithm to the generated cache architecture dependent data. In one embodiment, the flow of execution is transferred in response to the trigger that is accessed by trigger accessor 305. As mentioned above, the processor retrieves and executes the cache architecture dependent data to effect a transfer of execution to the cache architecture dependent data from the initialization algorithm.

Upon the transfer of the flow of execution to the generated cache architecture dependent data, cache line filler 307 fills each line in each way of the memory cache until cache memory is completely filled. An exemplary manner in which the cache memory is filled is discussed in detail above with reference to FIGS. 2A-2F above.

Once cache memory is filled with data, flow execution returner 311 returns the flow of execution of the initialization process back to the place in the initialization process from which it was transferred. In one embodiment, after the flow of execution is returned to the initialization process from which it was transferred the cache memory is completely filled with known instructions or data.

Operation Overview

In operation, upon the initiation of an initialization process, trigger accessor accesses a trigger that indicates that the initialization process has been initiated. Upon the access of a trigger indicating the initialization process has begun, flow execution transferer 309 transfers the flow of execution from the initialization algorithm to the generated cache architecture dependent data. Subsequently, cache line filler 307 fills each line contained in cache memory using the cache architecture dependent data that is generated by SFCM generator 301. Once all of the lines contained in cache memory have been filled, flow execution returner 311 returns the flow of execution of the initialization process back to the place in the initialization process from which it was transferred. At that time, any previously existing errors in cache memory should be cleared and any subsequently detected error should be considered to be real.

In one embodiment loading of the cache architecture dependent data can be accomplished by placing instructions at selected positions via self-modifying code. In another embodiment, loading of the cache architecture dependent data is accomplished using precoded executable functions. In one embodiment, where a pattern of instruction branches is used each instruction branch in the pattern of instruction branches moves the replacement algorithm through a way of said cache. In one embodiment, the identified parameters of said cache memory include but is not limited to line size, cache size, number of sets, associativity, and replacement algorithm.

In one embodiment, the replacement algorithm determines where respective lines are placed in said cache. As discussed above, parameters such as associativity and size determine the number of fills needed and how each set is to be filled. In one embodiment, a trigger to transfer the flow of execution to cache architecture dependent data can be provided by the onset of the initialization process.

It should be appreciated that the process of filling each line of the cache with known instructions or data eliminates errors that exist in the data stored in the memory cache. As discussed above, after the cache memory is filled, any previously existing errors should be cleared and any subsequently detected error should be considered to be real.

Embodiments of the present invention do not require additional hardware logic used solely for initialization of cache memory. Additionally, embodiments of the present invention do not require knowledge of the special mechanisms used to lock data into caches. Embodiments can be implemented based on a generic function that is created given basic parameters of the cache and available execution memory.

Figure 4:
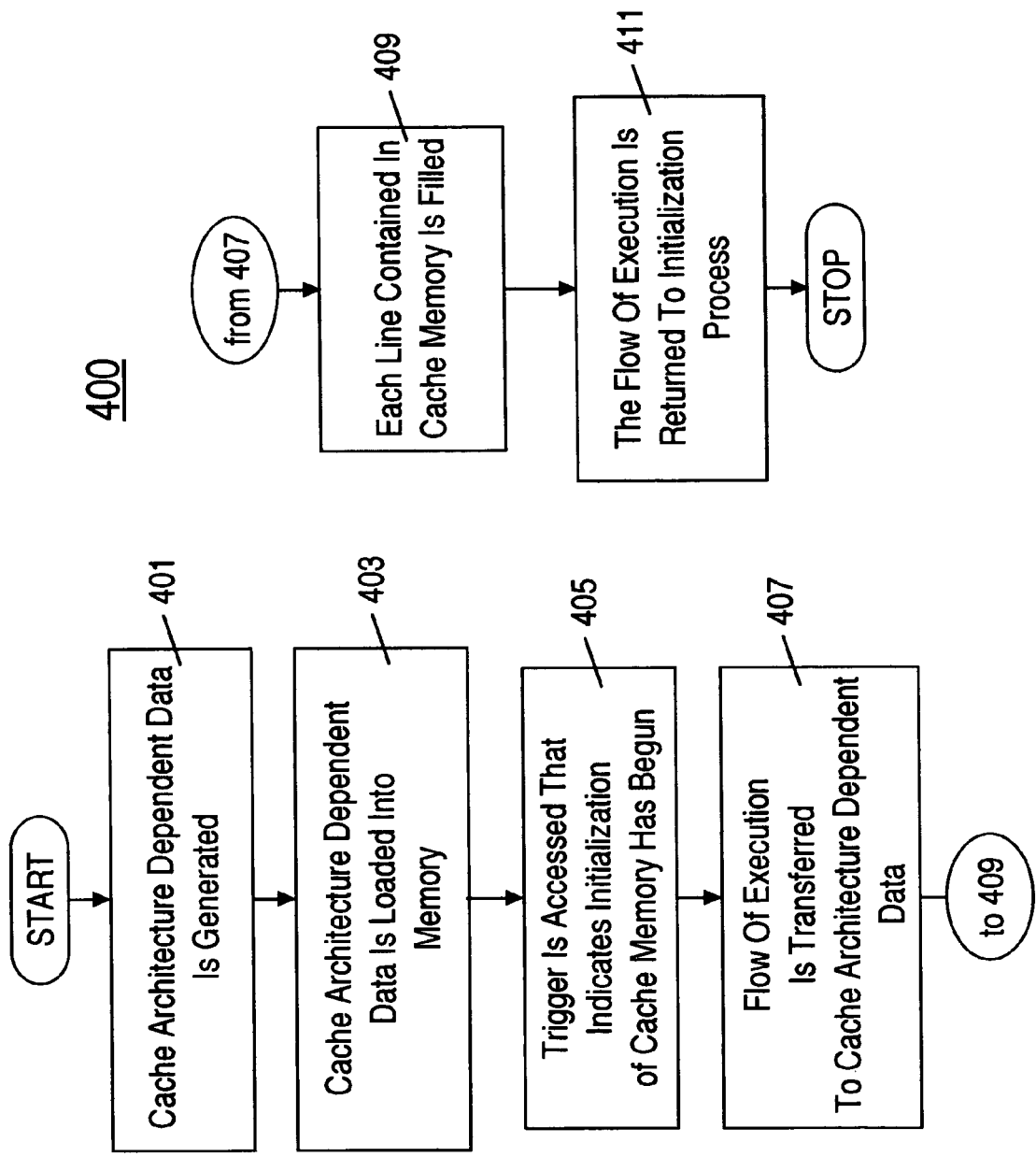
FIG. 4 shows a flowchart of a method for initialization of cache memory according to one embodiment of the present invention.

Exemplary Operations of Method for Filling Cache Memory for Cache Memory Initialization According to Embodiments of the Present Invention FIG. 4 shows a flowchart 400 of a method for initialization of cache memory according to one embodiment of the present invention. The flowchart includes processes of the present invention which, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 4, at step 401, cache architecture dependent data is generated. In one embodiment, the cache architecture dependent data causes the filling of each of the lines in cache memory. In one embodiment, the cache architecture dependent data is generated based upon identified parameters of the cache memory.

At step 403, the cache architecture dependent data generated at step 401 is loaded into cacheable memory or other memory. In one embodiment, the cacheable memory can be a part of one or more of the various data storage components of a computer system (e.g., RAM etc.).

At step 405, a trigger is accessed that indicates that an initialization of cache memory has begun. In one embodiment, a trigger accessor (e.g., 305 in FIG. 3) accesses the trigger that indicates that an initialization of cache memory (e.g., 103 in FIG. 1A) is being initiated. As described with reference to FIG. 3, the trigger prompts the processor to retrieve and load the cache architecture dependent data into memory as discussed above.

At step 407, the flow of execution is transferred from instructions associated with general initialization to the cache architecture dependent data generated in step 401 in response to the trigger accessed at step 405. In one embodiment, a flow execution transferer (e.g., 309 in FIG. 3) transfers the flow of execution from instructions associated with standard initialization processes to the generated cache architecture dependent data. In one embodiment, the flow of execution is transferred in response to the trigger that is accessed by a trigger accessor (e.g., 305 in FIG. 3).

At step 409, each line contained in said cache memory is filled by using the cache architecture dependent data that is generated at step 401. In one embodiment, a cache line filler (e.g., 307 in FIG. 3) fills each line contained in cache memory (e.g., 103 in FIG. 1A) by using the cache architecture dependent data generated by SFCM generator (e.g., 301 in FIG. 3). In one embodiment, as discussed above, the generated cache architecture dependent data is based upon identified parameters of cache memory.

At step 411 the flow of execution of the initialization process is returned back to the place in the initialization process from which it was transferred. In one embodiment, a flow execution returner (e.g., 311 in FIG. 3) returns the flow of execution back to the place in the initialization process from which it was transferred once cache memory has been filled.

In accordance with exemplary embodiments thereof, methods and systems for filling of cache memory for cache memory initialization are disclosed. In one embodiment, cache architecture dependent data is loaded into cacheable memory. The flow of initialization execution is transferred to the cache architecture dependent data in response to a trigger that indicates that an initialization of cache memory has been initiated. Each line contained in cache memory is filled using the cache architecture dependent data. The flow of initialization execution is returned back to the place in the initialization process from which it was transferred when the filling of cache memory is completed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for filling cache memory for cache memory initialization, said method comprising:

accessing a cache architecture dependent data that is based upon parameters of the cache memory;

accessing a trigger that indicates that an initialization process of said cache memory is being initiated, wherein the trigger causes a processor to execute the initialization process from a memory;

loading the cache architecture dependent data onto the cache memory, wherein the cache architecture dependent data comprises a set of instructions that the processor executes;

transferring the execution of said initialization process from the memory to the cache architecture dependent data loaded onto the cache memory;

filling each line contained in said cache memory by using said cache architecture dependent data; and returning the execution of said initialization process back to the place in said initialization process from which the execution of the initialization process was transferred.

2. The method of claim 1 wherein said cache architecture dependent data moves a non-random replacement algorithm through ways of said cache.

3. The method of claim 2 wherein said non-random replacement algorithm determines where respective lines are placed in said cache.

4. The method of claim 1 wherein said parameters of said cache memory comprise line size, cache size, number of sets, associativity, and replacement algorithm.

5. The method of claim 4 wherein said associativity and cache size determine a number of fills needed and how each set is to be filled.

6. The method of claim 1 wherein said cache architecture dependent data is placed within a contiguous region of memory or is spread across a wide range of memory.

7. The method of claim 1 wherein said trigger is provided by said initialization process.

8. The method of claim 1 wherein said filing each line eliminates errors that exist in data that is contained in said memory cache.

9. The method of claim 1 further comprising, after the transferring and before the returning, executing an instruction of the cache architecture dependent data.

10. The method of claim 1 wherein said filling comprises filling a portion of said cache memory with an executable instruction of said cache architecture dependent data.

11. The method of claim 1 wherein said filling comprises filling by executing an instruction of said cache architecture dependent data.

12. The method of claim 1 further comprising generating said cache architecture dependent data based upon the parameters of said cache memory.

13. The method of claim 1 further comprising generating said cache architecture dependent data comprising at least one executable instruction.

14. A computer system comprising:
a bus;
a computer readable memory unit connected to said bus;
a processor coupled to said bus said processor comprising cache memory and said processor for executing a method for initialization of cache memory comprising:
accessing a cache architecture dependent data that is based upon identified parameters of the cache memory;
receiving a trigger that indicates that an initialization process of said cache memory is being initiated, wherein the trigger causes a processor to execute the initialization process from a memory;
loading the cache architecture dependent data onto the cache memory, wherein the cache architecture dependent data comprises a set of instructions that the processor executes;
changing the execution of said initialization process from the memory to the cache architecture dependent data loaded onto the cache memory;
filling each line contained in said cache memory by using said cache architecture dependent data; and
returning the execution of said initialization process back to the place in said initialization process from which the execution of the initialization process was transferred.

15. The system of claim 14 wherein said cache architecture dependent data moves a non-random replacement algorithm through ways of said cache.

16. The system of claim 15 wherein said non-random replacement algorithm determines where respective lines are placed in said cache.

17. The system of claim 14 wherein said parameters of said cache memory comprise line size, cache size, number of sets, associativity, and replacement algorithm.

18. The system of claim 17 wherein said associativity and cache size determine a number of fills needed and how each set is to be filled.

19. The system of claim 14 wherein said cache architecture dependent data is placed within a contiguous region of memory or is spread across a wide range of memory.

20. The system of claim 14 wherein said trigger is provided by said initialization process.

21. The system of Claim14 wherein said filling each line eliminates errors that exist in data that is contained in said memory cache.

22. A system for initialization of cache memory, comprising:
a generator/loader for accessing a cache architecture dependent data that is based upon identified parameters of the cache memory
a trigger accessor for accessing a trigger that indicates that an initialization process of said cache memory is being initiated, wherein the trigger causes a processor to execute the initialization process from a memory;
a loader for loading the cache architecture dependent data onto the cache memory, wherein the cache architecture dependent data comprises a set of instructions that the processor executes;
a flow execution transferer for transferring the execution of said initialization process from the memory to the cache architecture dependent data loaded onto the cache memory;
a cache line filler for filling each line contained in said cache memory by using said cache architecture dependent data; and
a flow execution returner for returning the execution of said initialization process back to the place in said initialization process from which the execution of the initialization process was transferred.

23. The system of claim 22 wherein said cache architecture dependent data moves a non-random replacement algorithm through ways of said cache.

24. The system of claim 23 wherein said non-random replacement algorithm determines where respective lines are placed in said cache.

25. The system of claim 22 wherein said identified parameters of said cache memory comprise line size, cache size, number of sets, associativity, and replacement algorithm.

26. The system of claim 25 wherein said associativity and cache size determine a number of fills needed and how each set is to be filled.

27. The system of claim 22 wherein the cache architecture dependent data is placed within a contiguous region of memory or is spread across a wide range of memory.

28. The system of claim 22 wherein said trigger is provided by said initialization process.

29. The system of claim 22 wherein the cache architecture dependent data is placed within a contiguous region of memory or is spread across a wide range of memory.

30. A non-transitory computer useable medium having computer useable code embodied therein for causing a computer to perform operations comprising:
accessing a cache architecture dependent data that is based upon identified parameters of the cache memory;

accessing a trigger that indicates that an initialization process of said cache memory is being initiated, wherein the trigger causes a processor to execute the initialization process from a memory;

loading the cache architecture dependent data onto the cache memory, wherein the cache architecture dependent data comprises a set of instructions that the processor executes;

transferring the execution of said initialization process from the memory to the cache architecture dependent data loaded onto the cache memory;

filling each line contained in said cache memory by using said cache architecture dependent data; and returning the execution of said initialization process back to the place in said initialization process from which the execution of the initialization process was transferred.

31. The medium of claim 30 wherein said cache architecture dependent data moves the non-random replacement algorithm through ways of said cache.

32. The medium of claim 31 wherein said non-random replacement algorithm determines where respective lines are placed in said cache.

33. The medium of claim 30 wherein said identified parameters of said cache memory comprise line size, cache size, number of sets, associativity, and replacement algorithm.

34. The medium of claim 33 wherein said associativity and cache size determine a number of fills needed and how each set is to be filled.

35. The medium of claim 30 wherein said cache architecture dependent data is placed within a contiguous region of memory or is spread across a wide range of memory.

36. The medium of claim 30 wherein said trigger is provided by said initialization process.

37. The medium of claim 30 wherein said filling each line eliminates errors that exist in the data that is contained in said memory cache.

* * * * *